Feb. 28, 1961     S. L. GOLDSBOROUGH     2,973,461
SINGLE-COMPENSATOR THREE-PHASE RELAYS
Filed Sept. 20, 1957     4 Sheets-Sheet 1

United States Patent Office 2,973,461
Patented Feb. 28, 1961

2,973,461

SINGLE-COMPENSATOR THREE-PHASE RELAYS

Shirley L. Goldsborough, East Orange, N.J., assignor to Westinghouse Electric Corporation, East Pittsburgh, Pa., a corporation of Pennsylvania Filed Sept. 20, 1957, Ser. No. 685,168

8 Claims. (Cl. 317—47)

My invention relates to a protective relaying system which uses polyphase-responsive elements energized from polyphase compensated bus-voltages at the relaying station.

My invention is an improvement in a compensator relaying assembly which is described and claimed in an application of W. K. Sonnemann, Serial No. 685,155, filed September 20, 1957.

This assembly makes use of a new type of distance relay for the fault-protection of three-phase transmission-lines or power-lines by the use of a compensator or compensators, connected in series with the bus-voltages at the relaying station, and energized from one or more of the line-currents, for deriving a set of compensated three-phase relaying voltages which reproduce some aspect of the line-voltages at some predetermined fault-location in the power-line or system, in combination with polyphase-responsive relaying-means, energized from said compensated polyphase relaying voltages, for developing an operating component which is responsive to the magnitude of the negative-sequence component of said compensated three-phase relaying voltages, and a restraining component which is similarly responsive to the magnitude of the positive-sequence component of said compensated relaying voltages; or the relaying means may operate on the principle of a polyphase induction motor, energized from said compensated three-phase relaying voltages; or the relaying means may operate on the principle of a sine relay, energized from two of the phases of said compensated three-phase relaying voltages, for operating in response to the product of the magnitudes of said two phases, multiplied by the sine of the phase-angle between them.

Such a compensator relaying assembly has many advantages, including a great reduction in the number of relaying elements which are necessary for the protection of the power-line in each of the three distance-zones, zone 1, zone 2, and zone 3, which are commonly used in distance-relaying. Since the torque-producing element responds to phase-sequence components, a separate element is not needed for each phase.

The assembly of which my present invention forms a part has an additional advantage resulting from the fact that the polyphase-responsive compensated-voltage distance-responsive relaying-elements are inherently directional, thereby avoiding the need for a separate directional element or means, and eliminating the contact-coordination problem which is entailed by the use of separate distance and directional elements. This inherent directional response is obtained both at the balance-points of the distance-responsive elements and at the relaying bus, or more exactly, at the location of the line-current transformers.

In all types of compensated-voltage distance-relays using the general principles of my invention, the relay-response is zero if the fault is located exactly at the balance-point of the relay; if the fault is nearer than the balance-point, the negative-sequence component of the impressed relay-voltage is larger than the positive-sequence component, and the relay produces response in the operating direction; but if the fault is beyond the balance-point, the positive-sequence component is the larger, and the relay-response is in the restraining direction. But since the polyphase-responsive relaying element is very sensitive to small positive and negative-sequence components, the balance point can be set very accurately— much more accurately than has heretofore been achieved.

More particularly, my present invention relates to a new type of polyphase-responsive single-compensator three-phase-fault-responsive relaying-unit, for responding to three-phase faults on the protected power-line; and also to combinations of such a unit with other compensated-voltage polyphase-responsive units which supplement the action of my unit so that the assembly as a whole will give adequate protection against all kinds of multiple-conductor faults, or faults involving more than one of the line-conductors of the protected power-line.

In my new three-phase-fault-responsive relay-unit, a single line-drop compensator is used, which subtracts 1.5 times the line-drop to a predetermined fault-location in the protected power-line, from one phase of the bus-voltage at the relaying station, so as to make the unit have a balance point, or zero torque, both when a three-phase fault occurs at said predetermined fault-location, and when a three-phase fault occurs at the bus. At each balance point, the polyphase-responsive torque-producing relaying-element of the unit reverses its torque, so that the unit responds only to faults which are located between said predetermined fault-location and the bus.

My present invention also includes an addition, in the form of a current-energized coil or winding, which may be added to the single-compensator unit in order to make it respond to a three-phase fault located right at the bus, and also to three-phase faults which are located a relatively short distance back of the bus, or in the direction opposite to the normal, so-called forward, reach of the unit.

Still more specifically, my invention relates to compensated-voltage relaying units and systems of the general types just described, in which the polyphase responsive element is a multipolar torque-producing element using a cylindrical rotor, the multipolar element preferably having four poles which are so energized as to produce two diametrically flowing fluxes, each flux being responsive to one of the two compensated voltages which are applied to said torque-producing element. Such a torque-producing element is known to combine the advantages of a high operating-torque, and a low inertia, which together spell a high rate of response and great sensitivity of response, in combination with the elimination of the objectionable double-frequency pulsating torques. Since such a two-flux torque-producing element is not a balanced three-phase element, its energizing connections should be such as to provide no flow of zero-sequence current in the torque-producing element, so as to eliminate hybrid torques which are responsive to the products of the zero-sequence current multiplied by each of the two rotational-sequence currents, namely, the positive-sequence current and the negative-sequence current, respectively, which would shift the balance-point of the element.

With the foregoing and other objects in view, my invention consists in the apparatus, circuits, combinations and methods of operation, hereinafter described and claimed and illustrated in the accompanying drawing, wherein:

Figure 1:
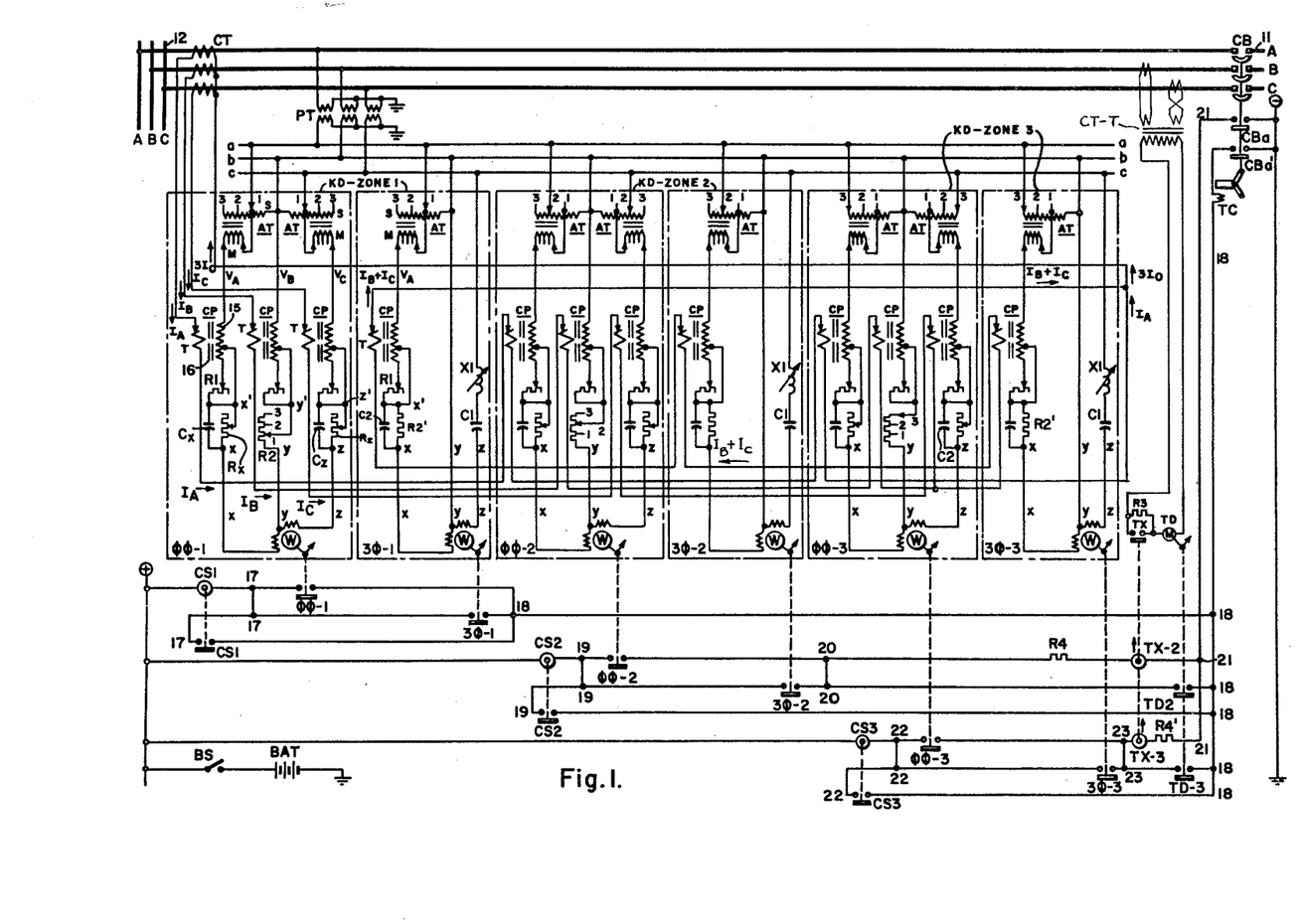
Fig. 1 is a diagrammatic view of the best form of embodiment of circuits and apparatus, which I at present prefer for embodying my invention in a non-carrier relaying equipment for protecting one terminal of a three-phase power-line against faults involving either two or three phases of the line.

In Fig. 1, I show my compensator relaying system, applied for the protection of a three-phase line-section 11, which is connected to a three-phase bus 12, at the relaying station, through a circuit breaker CB. A set of line-current transformers CT derive the line-currents $I_A$, $I_B$, $I_C$ and the star-point current $3I_0$ for relaying purposes, where $I_0$ is the zero-sequence component of the line-currents. A set of potential transformers PT is used for deriving the line or bus-voltages $a$, $b$ and $c$ for relaying purposes.

In Fig. 1, I show six relaying-units which I call type KD units, two for each of the three zones of protection, namely, a phase-fault unit φφ for responding to all kinds of double-line faults, and a three-phase unit 3φ for responding to three-phase faults, for each zone, the zones being indicated by appended numbers, such as the designation φφ–1 for the first zone phase-fault unit or element. I also show a time-delay element or timer TD, an auxiliary timer-starting relay TX, and three contactor-switches CS1, CS2 and CS3. The contacts of the circuit breaker CB and the various relay-elements are shown in their deenergized positions, and are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating-member, and to the contact-members of each relay-element, to denote their relationship. The timer TD has two contacts, which are distinguished as TD2 and TD3, which close after different time-delays suitable for the second-zone and third-zone relays, respectively.

Each of the six illustrated relaying-units operates on compensated voltages. Since the amount of the mutual compensator-impedance, which is required in the alternating-current relaying circuits, is directly proportional to the value of the derived bus-voltage which is used in said relaying circuits, I have shown, in Fig. 1, a convenient means for aiding in adjusting the effective impedance-value of each compensator, by adjusting the value of the derived bus-voltage which is applied to the relaying circuits. To this end, I show a plurality of autotransformers AT, each having three adjustable primary-connection taps numbered 1, 2 and 3 on each main autotransformer-winding S. The secondary or output circuit of each autotransformer in Fig. 1 is permanently connected to the tap S1, and this secondary circuit serially includes some fine-adjustment taps on a tertiary winding M of the autotransformer, which can add or subtract small fractional increments to the secondary voltage, according to the polarity of the connections to the M-taps. The output-circuit of the tertiary auto-transformer-winding M produces the effective bus-voltage which is used in that phase of the relaying circuit.

In the preferred form of embodiment of my invention, which is shown in Fig. 1, each of the compensators CP is provided with a tapped primary winding T, having a small number of turns, and a secondary winding 15, having a large number of turns, these two windings being magnetically interlinked through an air-gapped core 16, so that the compensator-voltage which is generated in the secondary winding 15 will be substantially 90°, or less, out of phase with the current which traverses the primary winding T, depending upon the amount of effective resistance R1. The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP} = \frac{Ts}{1 \pm M}$$

where T, S and M are the numbers or fractional numbers which are marked on the chosen taps of the compensator-primary T, the main autotransformer-winding S, and the tertiary autotransformer-winding M, respectively. In this manner, I provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, I am, of course, not limited altogether thereto.

It will be subsequently explained that, for the best results, the impedance-angle of the compensator-impedance should match the impedance-angle of the particular transmission-line 11 which is being protected. In accordance with an invention which is described and claimed in an application of Howard J. Calhoun, Serial No. 685,167, filed September 20, 1957, Fig. 1 shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from $R1=0$, to provide a minimum impedance-angle, to $R1=600$ ohms, to provide a maximum impedance-angle of approximately 85°, for example; or the resistance R1 may be infinity, or an open circuit, to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance-angles. This provides the best means which has heretofore been devised for accomplishing this purpose.

Referring now, to the phase-fault units φφ–1, φφ–2 and

φφ–3 of the three zones, 1, 2 and 3, of the non-carrier type KD relaying system shown in Fig. 1, it is a characteristic feature of these units, as described and claimed in the above-mentioned Sonnemann application, that each unit uses three identical compensators CP, connected in series with the respective open-delta voltage-terminals $V_A$, $V_B$ and $V_C$ which are supplied by two autotransformers AT. One of these two autotransformers AT has its primary connection across the delta phase $ba$ of the potential-transformer bus $abc$, while the other autotransformer has its primary connection across the delta phase $bc$. The three phase-fault relay units, φφ–1, φφ–2, and φφ–3, are designed to respond to line-to-line faults and to double line-to-ground faults. Said units are all alike, except for their different distance-settings, or the different impedance-settings of their compensators CP, as indicated by the choice of the S-taps 1, 2 and 3, respectively, for the first, second and third zones, as shown in Fig. 1.

The output-circuits of the two autotransformers AT of each phase-fault relay-unit, such as the unit φφ–1, thus provide an adjustable three-phase derived bus-voltage $V_A$, $V_B$, $V_C$. The primary windings T of the three compensators CP of each of these phase-fault units, such as φφ–1, are energized from the respective derived line-currents $I_A$, $I_B$ and $I_C$ which are supplied by the line-current transformers CT. The three compensators CP substract their respective compensator-voltages from the corresponding phases of the derived bus-voltages $V_A$, $V_B$ and $V_C$, producing a three-phase compensated voltage at the points $x'$, $y'$ and $z'$, as shown for the relay-unit φφ–1 in Fig. 1.

As described and claimed in Mr. Sonnemann's aforesaid application, the compensated voltages $x'$, $y'$ and $z'$ of each phase-fault relaying-unit, such as φφ–1 in Fig. 1, are used to energize a suitable type of torque-producing relaying-element which produces no torque at all (that is, it has a balance-point), when the positive and negative-sequence components of the impressed three-phase voltages $x'$, $y'$, $z'$ are equal to each other (which is the case when the voltage-triangle has collapsed to a single line or phase), or when said voltage-triangle has completely collapsed to a point. Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$.

There are advantages in using a two-circuit torque-producing element, as diagrammatically indicated by the wattmeter type of single-phase relay-element W in each of the six relaying units φφ–1, 3φ–1, φφ–2, 3φ–2, φφ–3 and 3φ–3 as diagrammatically indicated in Fig. 1. There are various ways in which the two circuits for each of these torque-producing elements may be energized, from any two differing voltages which may be derived from different phases of the three-phase compensated voltages, such as $x'$, $y'$, $z'$ of Fig. 1.

In the particular circuit-connections which are shown for the φφ–1 relay-unit in Fig. 1, the two-circuit torque-producing element W has one winding-circuit $xy$ energized across the delta-phase $x'y'$ of the compensated three-phase voltages $x'y'z'$, while its other winding-circuit $zy$ is energized across the delta-voltage phase $z'y'$. If the circuit-connections to and within the two-circuit torque-producing element W are such that no zero-sequence currents can flow in this element, as in the connections shown for the φφ–1 unit in Fig. 1, then the torque-producing element will have no hybrid, balance-point-shifting responses to the product of the zero and positive-sequence relay-currents or to the product of the zero and negative-sequence relay-currents.

As described and claimed in the aforesaid Calhoun application, it is desirable, for best operation, in the phase-fault units, such as φφ–1 of Fig. 1, to balance both the steady-state and the transient impedance-angles in the three circuits leading up to the common connection $y$ of the wattmeter-element terminals $xyz$. This refers to the impedances which are connected between the bus-voltage terminal $a$ and the relay-terminal $y$, the impedances which are connected between the bus-voltage terminal $b$ and the relay-terminal $y$, and the impedances which are connected between the bus-voltage terminal $c$ and the relay-terminal $y$.

As described and claimed in the aforesaid Calhoun application, the impedance-angles in these three circuits are kept substantially equal, notwithstanding the angle-changes which are introduced by changing the primary taps S1, S2 and S3 on the autotransformers AT, by introducing a resistance R2 in circuit between the points $y'$ and $y$, and providing this resistance R2 with three taps, also numbered 1, 2 and 3, which are changed simultaneously with the S-taps of the autotransformers. Dissimilar transient effects, due to sudden bus-voltage changes in the three circuits $ay$, $by$ and $cy$, are compensated for by serially including capacitors $C_x$ and $C_z$ between the points $x'$ and $x$ and between the points $z'$ and $z$, respectively, to compensate for the inductive reactances in these circuits. The effective values of these angle-adjustment capacitors $C_x$ and $C_z$ are adjustable by means of parallel-connected adjustable resistances $R_x$ and $R_z$, respectively.

These transient-suppressing circuit-portions $(C_xR_x)$, R2, and $(C_zR_z)$ balance the phase-angles of the impedances of the three circuits $ay$, $by$ and $cy$, with open primaries on the three compensators CP. Thus, when a close-in phase-to-phase fault occurs, behind the current transformers CT, one of the delta bus-voltages $V_{AB}$, $V_{BC}$, or $V_{CA}$ is collaped to zero. If we assume the extreme system-condition of no back-feed current over the line which is being protected, the compensators do nothing to alter this collapsed voltage. Under this condition, there should be no spurious torque in the relay to cause it to respond incorrectly. The transient-suppressing elements prevent such spurious response as might otherwise be occasioned by the sudden change in the bus-voltages in the extreme case in which they may be no current in the primaries of the compensators.

Fig. 1 also shows three three-phase-fault-responsive relays 3φ–1, 3φ–2 and 3φ–3, one for each of the three zones, embodying the basic concept of my present invention, but in an improved form which is described and claimed in a Chevalier application Serial No. 685,277, filed September 20, 1957. These three three-phase relays are all alike, except for their distance-settings which are changed in much the same manner as has been described for the phase-fault relays φφ–1, φφ–2, φφ–3, so that a description of one, say the three-phase element 3φ–1, will suffice for all.

A principal characteristic feature of this three-phase fault-responsive relay 3φ–1, as distinguished from the phase-to-phase fault-responsive relay φφ–1, is that the three-phase relay 3φ–1 uses only a single compensator CP, which has 1.5 times the effective mutual impedance of each of the three compensators CP which are used in the phase-fault relay φφ–1. The phase in which this single compensator CP is connected, in the relay-unit 3φ–1 of Fig. 1, is designated as phase A. This three-phase unit 3φ–1 uses a single autotransformer AT, which is similar to the autotransformers which have been described for the phase-fault relay φφ–1. This single autotransformer AT is connected between the phases $b$ and $a$ of the relaying bus $abc$, so as to provide the adjustable voltage $V_A$, which is phase A of the three-phase bus-voltages which are used for energizing the torque-producing element W of this three-phase unit 3φ–1, the other two bus-voltage phases being the phases b and c, unchanged.

In the three-phase unit 3φ–1, the single compensator CP has its secondary winding 15, with some of its turns shorted through a mutual-impedance angle-controlling resistor R1, connected in series with the bus-voltage terminal $V_A$, to produce the compensated voltage $x'$, as described for the phase-fault relay φφ–1, remembering that the compensator CP in the three-phase relay 3φ–1 has an impedance-setting which is 1.5 times as high as in the phase-fault relay φφ–1.

In the case of the three-phase relay 3φ–1 which is shown in Fig. 1, the compensator-primary T is traversed by the current $-(I_B+I_C)$, which is equal to $(I_A-3I_0)$, where $I_0$ is the zero-sequence component of the line-current, as derived by the current-transformers CT, as described and claimed in the previously mentioned Chevalier application, Serial No. 685,277.

The cylinder-unit W, which is used in the three-phase relay-element 3φ–1 in Fig. 1, is basically a two-phase induction motor which produces torque in a direction which is determined by the phase-angle between the two voltages, and in a magnitude which is responsive to the product of the two voltages which are impressed upon the torque-producing element. When a three-phase fault occurs close to the bus 12 at the relaying terminal of the protected line 11, all of the delta voltages of the bus will collapse to zero. And since the three-phase element 3φ–1 uses only one compensator CP, there will be a voltage $x'$ in only one phase of the three-phase voltages which are supplied to the torque-producing cylinder-unit W, this phase being the phase which contains the compensator CP. This provides energization for the phase-winding xy of the torque-element W. However, the energization for the other phase-winding zy of the torque-element collapses to zero, in response to a three-phase line-fault near the bus, which means that the torque-element, if it responded at all under such conditions, would have only a momentary transient response, as a result of its memory-action as the uncompensated zy voltage is collapsing to zero.

In order that the three-phase fault-responsive unit 3φ–1 may react, with accuracy or intelligence, to a three-phase line-fault close to the relaying station 12, it is desirable not only to sustain a sufficient magnitude of the uncompensated bus-voltage zy which is applied to the torque-producing element, so that there can be a sufficient torque to operate the relay, but also to sustain or maintain the proper phase-angle between the two relay-voltages xy and zy, long enough for the relay to react at all, and to know in which direction to react, because the relay-torque is determined by the product of the magnitudes of the impressed voltages, multipled by the sine of the phase-angle between these two voltages.

As described and claimed in the previously mentioned Calhoun application, the uncompensated zy voltage on the torque-element W of the three-phase unit 3φ–1 is sustained, for a sufficiently long time, by a memory-circuit comprising a serially connected capacitor C1 and an adjustable choke-coil X1, connected in series between the bus-terminal c and the terminal z of the torque-producing element W. It is necessary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit, in the relaying unit 3φ–1 of Fig. 1, necessarily introduces a transient disturbance, which is suppressed or compensated for, in accordance with the Calhoun invention, by connecting a second capacitor C2 between the points $x'$ and $x$, in the compensated-voltage phase $x$ of said torque-element 3φ–1 of Fig. 1, this second capacitor C2 being shunted by a resistor R2' which not only enhances the effect of the capacitor C2, but also enables said capacitor to suppress transients with as little memory-action as possible.

The relaying equipment which is shown in Fig. 1 requires a timer, such as TD, which is available whenever there is a line-fault involving at least two of the line-phases. While I am not limited as to exact details, I prefer to use a single-phase timer TD, which receives an energizing current whenever a fault-current is flowing, involving at least two of the line-phases. By way of example, I have shown the timer TD as being a motor-element M which is energized from a saturable many-turn current-transformer CT–T, which is in turn energized, for example, by the difference of the line-currents $I_B$ and $I_C$.

The timer-motor TD is connected in series with the normally open make-contact TX of an auxiliary timer-relay TX. This make-contact TX is bypassed by a resistance R3, which is sufficiently small to avoid substantially open-circuiting the current-transformer CT–T when said contact TX is open, but the resistance R3 is sufficiently large to prevent the timer TD from operating when said resistance is connected in series with it.

The six fault-responsive elements of Fig. 1 have correspondingly numbered make-contacts φφ–1, 3φ–1, φφ–2, 3φ–2, φφ–3 and 3φ–3, which are used to control certain relaying-circuits which are shown as being energized from a positive direct-current bus (+).

The first circuit which is connected to the positive bus (+) in Fig. 1 is a first-zone tripping-circuit which includes the operating-coil of a contactor-switch CS1, then a circuit 17, then the make-contact φφ–1 of the first-zone phase-fault unit φφ–1, then a tripping-circuit 18, which extends up through the trip-coil TC of the circuit breaker CB, and finally through an auxiliary circuit-breaker make-contact CBa' to a negative bus (−), the circuit-breaker make-contact CBa' being closed when the circuit breaker CB is closed, the circuits being illustrated, however, with all switches and relays open or deenergized. Two branch-circuits are also provided between the points 17 and 18 of the first-zone protective-relaying equipment, these two branch-circuits including, respectively, the make-contact 3φ–1 of the first-zone three-phase unit 3φ–1, and the make-contact CS1 of the contactor-switch CS1.

A second-zone relaying-circuit is next shown in Fig. 1, extending from the positive bus (+) through the energizing-coil CS2 of a second contactor-switch CS2, then to a circuit 19, then through the make-contact φφ–2 of the second-zone phase-fault unit φφ–2 to a circuit 20, then through a resistor R4 and through an operating-coil TX–2 of the auxiliary timer-relay TX to a circuit 21, which extends up through an auxiliary make-contact CBa of the circuit breaker CB, and thence to the negative bus (−). The two circuits 19 and 20 are joined also by a branch-circuit which includes the make-contact 3φ–2 of the second-zone three-phase unit 3φ–2, consequently, the circuit 20 is energized as a result of the response of either one of the two second-zone units φφ–2 or 3φ–2. This circuit 20 thus energizes the auxiliary timer-relay TX, which initiates the movement of the timer TD, whenever there is a line-fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil, either because of its built-in resistance, or because of an externally connected resistance R4, does not draw sufficient current from the circuit 20 to pick up the second contactor-switch CS2, but the trip-coil TC draws a very heavy current as soon as the second-zone timer contact TD2 closes, thus causing the second contactor-switch CS2 to pick up and close its make-contact CS2, which completes a circuit-connection between the circuits 19 and 18, thus sealing-in the second-zone tripping- response.

A third relaying-circuit is connected, in Fig. 1, from the positive bus (+) through the operating-coil of a third contactor-switch CS3, then to a circuit 22, then to two branch-circuits, one extending from the circuit 22 through the make-contact $\phi\phi$–3 of the third-zone phase-fault unit $\phi\phi$–3 to a circuit 23, the second branch-circuit extending from the circuit 22 through a make-contact 3$\phi$–3 of the third-zone three-phase unit 3$\phi$–2 to said circuit 23. From the circuit 23, a first branch-circuit continues through a second operating-coil TX–3 of the auxiliary timer-relay TX, and thence to the circuit 21, so that the auxiliary timer-relay TX will initiate the movement of the timer TD whenever there is a line-fault which activates either one of the third-zone relays.

A second branch-circuit of the circuit 23 is provided, to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor-switch CS3 is energized, picking up its make-contact CS3, and closing a circuit-connection between the conductors 22 and 18.

At the bottom of Fig. 1, the positive bus (+) is shown as being energized, through a battery-switch BS, from the positive terminal of a battery BAT, the negative terminal of which is grounded, to connect with the grounded negative bus (−).

My invention is also adaptable for transmission-line protection-systems using carrier-current. Such a carrier system is shown, by way of example, in a preferred form of embodiment, in Figs. 2A and 2B. The equipment shown in Figs. 2A and 2B agrees with Fig. 1 to the extent of using the same circuit breaker CB, current-transformers CT, potential-transformers PT, first and second-zone elements $\phi\phi$–1, 3$\phi$–1, $\phi\phi$–2 and 3$\phi$–2, and timer TD, as in Fig. 1. In addition, the apparatus in Figs. 2A and 2B includes an auxiliary timer-relay TX which is the same as in Fig. 1 except that it has two operating-coils TX–2 and TX–3, the first coil TX–2 for operating the timer-relay in response to second-zone faults involving more than a single line-phase, and the second coil TX–3 for operating the timer-relay in response to third-zone faults involving more than one line-phase. The system shown in Figs. 2A and 2B differs from Fig. 1 in including certain different equipment, which will now be described.

Figure 2A:
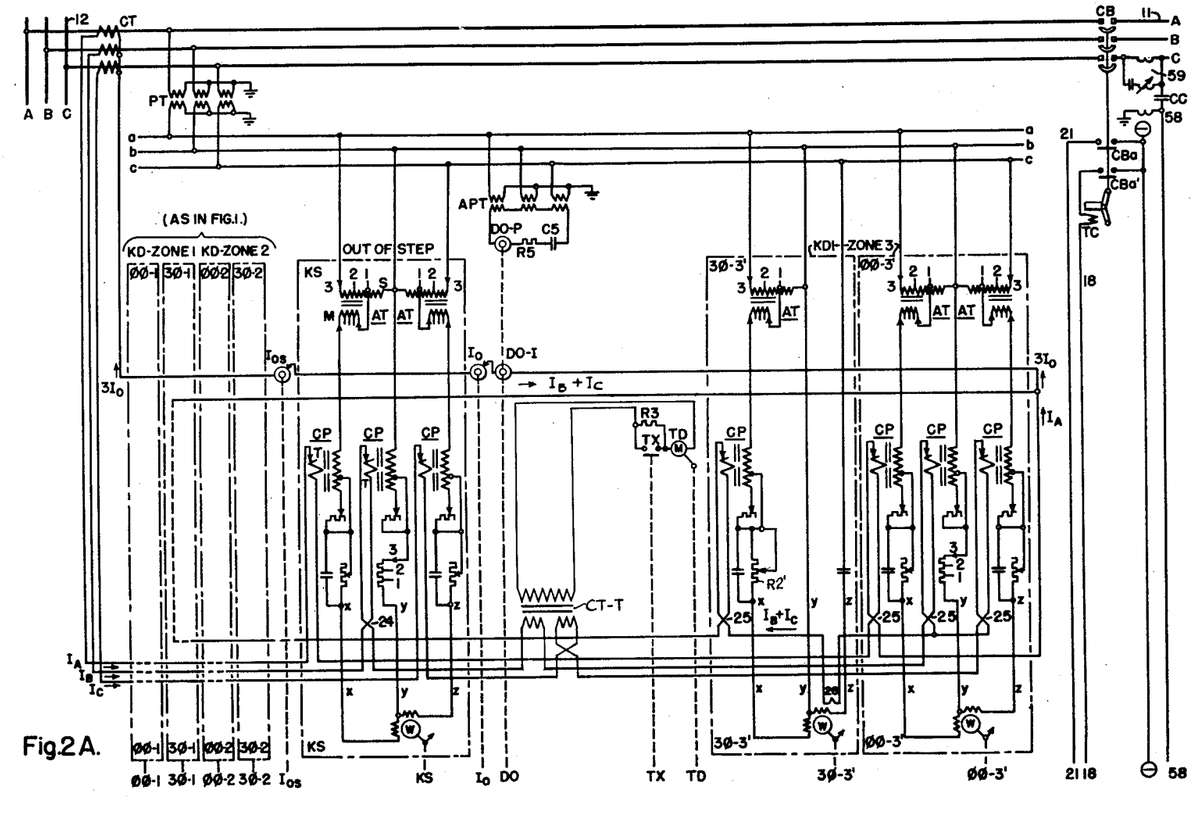
Figs. 2A and 2B together constitute a diagrammatic view showing circuits and apparatus in the best form of embodiment which I at present contemplate for embodying my invention in the relaying equipment which is provided at one relaying terminal in a complete carrier-current relaying system for the complete protection of a power-system, including protection against ground-faults as well as all kinds of phase-faults.

As shown near the middle of Fig. 2A, the neutral wire of the current-transformers CT, which carries the current $3I_0$, is shown as energizing three coils which have previously been known for the purpose of incorporating single-phase ground-fault protection in a carrier-current system, these three coils being the operating-coil $I_{OS}$ of a sensitive, carrier-starting, ground-fault relay $I_{OS}$, the operating-coil $I_0$ of a somewhat less sensitive (but still very sensitive) ground-fault detector $I_0$, and the current-coil DO–I of a ground-fault directional element DO. This ground-fault directional element DO is also provided with a polarizing coil DO–P, which is shown as being energized, through a phase-shifting impedance including a resistor R5 and a capacitor C5, from the open-delta secondary circuit of a set of auxiliary potential-transformers APT, which are energized from the relaying-voltage bus $abc$.

The equipment shown in Fig. 2A also includes a out-of-step relaying-unit KS, of a compensated-voltage type which is shown and described in an application of S. L. Goldsborough and J. G. Chevalier, Serial No. 685,278, filed Stepember 20, 1957. This carrier-starting relay KS is a three-phase fault-responsive relay, having a reach or balance-point which is sufficiently farther out, away from the relaying station, so that, in the event of a phase-swing of the transmission-system toward an out-of-step condition, the out-of-step relay KS will pick up, some three or four cycles (or other convenient time) sooner than the second-zone three-phase fault responsive element 3$\phi$–2.

The out-of-step relay KS of Fig. 2A is somewhat like the third-zone phase-fault relay $\phi\phi$–3 of Fig. 1, except that one of the three compensators CP is reversed, as indicated at 24 in the connections to the primary winding T. In Fig. 2A, this reversed compensator CP is shown as the one which is connected in series with phase $b$ of the potential-bus $abc$. If the impedance of this reversed compensator is exactly 0.5 times the impedance of the other two compensators in this relay-unit, the relay will have a zero response to a three-phase fault which occurs precisely at the relaying bus, or more accurately, precisely at the current-transformers CT, and the relay will have a positive response to three-phase faults which occur in front of the bus, and a negative response (which means, no response at all), to three-phase faults which occur behind the bus.

It is usually desirable, however, to make the impedance of the reversed compensator CP more than 0.5 times the impedance of the other two compensators CP in the out-of-step relay KS, so that the relay will respond to three-phase faults at the bus, and will keep on responding for faults located a certain distance back of the bus (or a certain rearwardly reaching distance measured in a direction opposite to the predetermined balance point in the so-called "forward" reach of the relay). The "rearward" reach is dependent upon the amount by which the impedance of the reversed compensator exceeds 0.5 times the impedance of each of the other two compensators. If the reversed compensator is set for an impedance which is, say 0.55 times that of either of the other two compensators, the backward reach of this relay-element will be only a small amount, and this is theoretically sufficient. However, in actual practice, a larger amount of backward reach would ordinarily be used. It may be convenient to use a reversed compensator having the same impedance as the two unreversed compensators, in this out-of-step relay KS, in which case, however, the rearward reach will be considerably less than the forward reach.

The essential qualification of the out-of-step relay KS is that its backward reach will be sufficient to keep the response-circle of this relay far enough outside of the response-circle of the second-zone three-phase relay 3$\phi$–2 so that a line-swing toward an out-of-step condition picks up the KS relay, on the outer circle, a sufficient time before the system-swing reaches the inner circle.

The forward reach of this relay KS, in response to three-phase faults, is determined solely by the setting of the two unreversed compensators CP. When I speak of three-phase faults, I refer to line-conditions which look, to the relay, like a three-phase fault, as in an out-of-step swing, as is well understood.

Figure 2B:
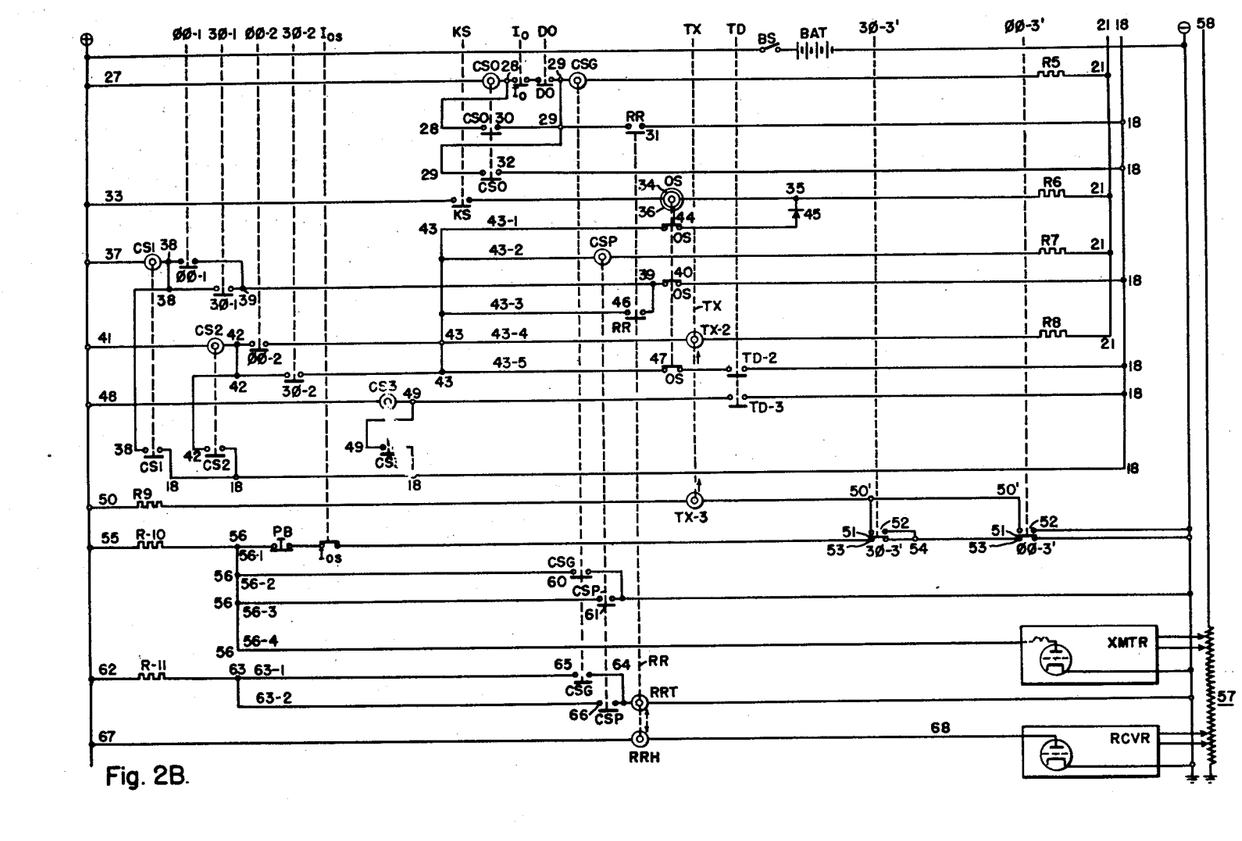

In the carrier-current system of Figs. 2A and 2B, the third-zone relaying elements 3$\phi$–3' and $\phi\phi$–3', which respond to faults involving more than one line-conductor, are connected in such polarity as to reach backwardly, rather than forwardly, in a manner which has been customary since the Goldsborough Patent 2,386,209, granted October 9, 1945. Consequently, the carrier-current relaying-equipment which is shown in Figs. 2A and 2B includes a backward-looking third-zone three-phase element 3$\phi$–3', and a backward-looking third-zone phase-fault element $\phi\phi$–3', which differ from the elements 3$\phi$–3 and $\phi\phi$–3 of Fig. 1 in that the excitations of the primary coils of all four of their compensators are reversed, as shown at 25.

There are also two other differences, in the backwardly looking third-zone three-phase relay-element $3\phi$–$3'$ of Fig. 2A: the adjustable choke coil X1 of the corresponding third-zone forwardly looking element $3\phi$–$3$ of Fig. 1 has been omitted in Fig. 2A, as being unnecessary; the capacitor-shunting resistor R2' has been made adjustable to provide the impedance-angle-matching function which could previously be accomplished by the adjustable choke coil X1; and the stator windings of the torque-element W of the reversed third-zone three-phase element $3\phi$–$3'$ of Fig. 2A have been modified, in accordance with my present invention, by the addition of a single-turn current-energized winding 26, which is located so as to provide a flux in the poles which are energized by the uncompensated voltage-phase yz. This current-energized winding 26 is energized by the same current which affords the compensation for the winding xy of this torque-producing element. This current-energized winding 26 enables the backwardly looking three-phase element $3\phi$–$3'$ in Fig. 2A to respond to a three-phase fault at the bus, because, under such circumstances, the torque-producing element has two out-of-phase fluxes, one due to the compensator impedance-drop, and the other due to the current $(I_B + I_C)$ or $-(I_A - 3I_0)$. This auxiliary current-energized coil or winding 26 has no effect upon the relay-performance except for faults which are very close to the bus.

The direct-current relaying circuits of the carrier-current relaying equipment of Figs. 2A and 2B are shown in Fig. 2B.

At the top of Fig. 2B, a battery BAT is shown as energizing the positive and negative buses $(+)$ and $(-)$ through a battery-switch BS.

Next, in Fig. 2B, is shown a circuit 27, which extends from the positive bus $(+)$ through the operating coil of a contactor-switch CSO to a circuit 28, and thence through the ground-current relay-contact $I_0$ and the ground-directional relay-contact DO to a circuit 29, from which point a circuit continues on, through the operating-coil of a ground-fault contactor-switch CSG, and a resistance R5, to the previously mentioned circuit 21 which extends up through the auxiliary make-contact CBa of the circuit breaker CB, and thence to the negative bus $(-)$. The serially connected relay-contacts $I_0$ and DO are bypassed by a make-contact 30 of the contactor-switch CSO. The conductor 29 is also used to energize the tripping circuit 18 through a make-contact 31 of a carrier-current receiver-relay RR, which will be subsequently described. The contactor-switch CSO does not pick up, on the light currents which are used for energizing the CSG relay, but when the receiver-relay contact 31 closes, energizing the tripping-circuit 18, a heavy current is drawn by the trip coil TC, thus causing the contactor-switch CSO to pick up. The contactor-switch CSO thereupon picks up, and closes not only its previously mentioned make-contact 30, but also a second make-contact 32, this last-mentioned contact 32 being used to complete a branch-circuit connection between the points 29 and 18.

Next, Fig. 2B shows a circuit 33, which extends from the positive bus $(+)$ through the make-contact KS of the out-of-step relay KS, and thence through the operating-coil 34 of a delayed auxiliary out-of-step relay OS, to a circuit 35, and thence through a resistance R6 to the previously mentioned conductor 21 which extends to the negative bus through the circuit-breaker make-contact CBa. The auxiliary out-of-step relay OS is a delayed relay, which is provided with a slug or short-circuited winding 36 in such position as to make this relay a little slow in picking up.

Reference will next be made, in Fig. 2B, to a circuit 37, which extends from the positive bus $(+)$, through the operating-winding CS1 of the contactor-switch CS1 to a circuit 38, and thence through the make-contact $\phi\phi$–1 of the first-zone phase-fault relay $\phi\phi$–1 to a circuit 39, and thence through a back-contact 40 of the auxiliary out-of-step relay OS to the trip-circuit 18. A branch-circuit also extends from the conductor 38 to the conductor 39, through the make-contact $3\phi$–1 of the first-zone three-phase relay $3\phi$–1. A third branch-circuit extends from the conductor 38 to the tripping-circuit 18, through the contactor-switch make-contact CS1.

Reference will next be made, in Fig. 2B, to a circuit 41, which extends from the positive bus $(+)$ through the operating-coil of the contactor-switch CS2 to a circuit 42. Two parallel branch-circuits extend on, from the conductor 42 to a conductor 43, one of these branch-circuits including the contact $\phi\phi$–2 of the second-zone phase-fault relay $\phi\phi$–2, while the other branch-circuit includes the contact $3\phi$–2 of the second-zone three-phase relay $3\phi$–2. A third branch-circuit extends from the conductor 42 to the tripping-circuit 18, through the contactor-switch contact CS2.

The circuit 43 is thus energized in response to any second-zone fault which involves more than one line conductor, that is, when either of the second-zone relays $\phi\phi$–2 or $3\phi$–2 responds. This second-zone fault-responsive circuit 43 has five branching extensions 43–1 through 43–5. The circuit 43–1 extends through a back-contact 44 of the auxiliary out-of-step relay OS, and thence through a forwardly conducting rectifier 45 to the previously mentioned circuit 35. The rectifier 45 thus pulls up the potential of the circuit 35 practically to that of the positive bus $(+)$, thus short-circuiting (and deenergizing) the operating-coil OS, whenever there is a response of either one of the second-zone relays $\phi\phi$–2 or $3\phi$–2.

The branch-circuit 43–2 energizes the operating-coil CSP of a phase-fault contactor-switch CSP, in a circuit which extends through a resistance R7 to the previously mentioned circuit 21; the branch-circuit 43–3 extends to the previously mentioned conductor 39 through a make-contact 46 of the previously mentioned receiver-relay RR; the branch-circuit 43–4 extends through the second-zone operating-coil TX–2 of the auxiliary timer-relay TX, and thence through a resistor R8 to the circuit 21; and the branch-circuit 43–5 extends through a back-contact 47 of the auxiliary out-of-step relay OS, and then through the second-zone contact TD–2 of the timer TD to the trip-circuit 18.

Fig. 2B next shows a circuit 48, which extends from the positive bus $(+)$ through the operating-coil of the contactor-switch CS3 to a circuit 49, and thence through the third-zone timer-contact TD–3 to the tripping-circuit 18. A bypassing circuit-connection is also supplied from the conductor 49 to the tripping-circuit 18 through the contactor-switch make-contact CS3.

The next two circuits of Fig. 2B, starting with a circuit 50, incorporate a specific circuitry which is the invention of Herbert W. Lensner. While I am not limited to this particular circuitry, I nevertheless prefer to use it as being superior to other available circuits, and hence I have shown it in the preferred form of embodiment of my carrier-current relaying-equipment.

In Fig. 2B, the circuit 50 extends from the positive bus $(+)$ through a resistor R9 to the third-zone operating-coil TX–3 of the auxiliary timer-relay TX, and thence to a circuit 50'.

Each of the two backwardly looking third-zone elements $3\phi$–$3'$ and $\phi\phi$–$3'$ is provided with a make-break contact-assembly having a single moving contact 51, which is common to both a make-contact 52 and a break or back-contact 53. The make-contact 52 of the phase-fault element $\phi\phi$–$3'$ is connected between the negative circuit 50 of the auxiliary-timer-relay coil TX–3 and the negative bus $(-)$. The back-contact 53 of this same phase-fault element $\phi\phi$–$3'$ is connected between a circuit 54 and the negative bus (—). The make-contact 52 of the three-phase fault-responsive element 3φ–3' is connected between the aforesaid circuit 50' and the circuit 54. In this way, if there is an operation of the backwardly looking third-zone phase-fault relay φφ–3', it will disconnect the circuit 54 from the negative bus, and it will connect the circuit 50' to the negative bus, thus energizing the third-zone operating-coil TX–3 of the auxiliary timer-relay TX, which starts the timer TD. If the backwardly looking third-zone phase-fault relay φφ–3' does not operate, but if the backwardly looking third-zone three-phase relay 3φ–3' operates, then such operation will connect the circuit 50' to the negative bus (—) through the circuit 54 and the back-contact 53 of the phase-fault relay φφ–3', thus again energizing the third-zone operating-coil TX–3 of the auxiliary timer-relay TX.

The next circuit shown in Fig. 2B is a carrier-starting circuit 55, which extends from the positive bus (+) through a resistor R–10 to a carrier-starting circuit 56, which, if it is not shorted over to the negative bus (—), will energize the positive circuit 56–4 of a carrier-current transmitter XMTR, which is diagrammatically illustrated as being coupled to a carrier-current autotransformer 57, which is connected to a circuit 58, which extends up through Fig. 2A, to a coupling-capacitor CC which is connected on the line-side of a carrier-frequency trap 59 which is shown as being connected in phase C of the protected line 11.

Three branch-circuits 56–1 to 56–3 are shown, whereby the transmission of carrier current by the transmitter XMTR may be prevented by connecting the circuit 56 over to the negative bus (—), thereby bringing down the potential of this circuit to that of the negative bus. The branch-circuit 56–1 is connected to the previously described circuit 54 through a normally closed carrier-testing pushbutton PB, the back-contact $I_{OS}$ of the carrier-starting ground-fault relay $I_{OS}$, and the back-contact 53 of the backwardly looking third-zone three-phase relay 3φ–3'. Thus, carrier-transmission is permitted if the pushbutton PB is depressed for testing purposes, or if there is a fault-responsive operation of any one of the three relays $I_{OS}$, 3φ–3', or φφ–3'.

The branch-circuit 56–2 is connected to the negative bus (—) through a make-contact 60 of the ground-fault contactor-switch CSG, so as to make sure that the carrier is off whenever the relays $I_0$ and DO, in the circuit 28–29, indicate the presence of a ground-fault in a forwardly looking direction, which requires a tripping operation.

The branch circuit 56–3 is connected to the negative bus (—) through a make-contact 61 of the phase-fault contactor-switch CSP, which responds when there is a second-zone fault involving more than one line-conductor, in a forwardly looking direction.

The last two circuits of Fig. 2B are conventional circuits which are common in carrier-current relaying. Thus, the circuit 62 connects the positive bus (+) through a resistor R–11 to a circuit 63, which is connected on, through two parallel branch-circuits 63–1 and 63–2, to a circuit 64, which energizes the operating or tripping-coil RRT of the receiver-relay RR. The first branch-circuit 63–1 includes a make-contact 65 of the ground-fault contactor-switch CSG, while the second branch-circuit 63–2 contains a make-contact 66 of the phase-fault contactor-switch CSP.

The last circuit 67 in Fig. 2B connects the positive bus (+) through a holding or restraining-coil RRH of the receiver-relay RR, and thence to the positive circuit 68 of a carrier-current receiver RCVR which is diagrammatically shown as being coupled to the carrier-current autotransformer 57.

My present invention relates not only to the novel design of the single-compensator three-phase-fault-responsive relaying-units 3φ–1, 3φ–2, 3φ–3 and 3φ–3', and to all uses and adaptations thereof, but it also relates to the illustrated combinations of these units with the other relaying-units using the principle of compensated-voltage polyphase-responsive torque-producing elements; or, in general, it relates to combinations of my particular units with other compensated-voltage relaying-units which are properly responsive to the multiple-conductor faults which are not adequately responded to by my units.

In all of the relaying-units in which the torque-producing element is shown as a two-phase wattmeter-type element W, which is energized from two different voltages of a compensated three-phase voltage-supply $xyz$, the essential thing about the torque-producing element W is that it shall be a polyphase-responsive element which develops an operating force when its impressed voltages have a negative sequence of phases, or which develops an operating force which is responsive to the magnitude of the negative-sequence component of the compensated three-phase relaying voltages, and a restraining force which is similarly responsive to the magnitude of the positive-sequence component of said compensated relaying voltages; or that the torque-producing element W shall produce an operating torque when the negative-sequence component is larger than the positive-sequence component of the compensated relaying voltages, while producing a negative or non-operating torque when the positive-sequence component is the larger; or that the torque-producing element W shall be any torque-producing element operating on the principle of a polyphase (two phase or three-phase, or the like) induction motor (having balanced or unbalanced polyphase windings), energized from said compensated three-phase relaying voltages $xyz$, and having a starting-torque corresponding to $(\bar{E}_1^2 - \bar{E}_2^2)$, where $\bar{E}_1$ and $\bar{E}_2$ are the respective scalar values of the positive and negative-sequence voltages, such a motor being used as a relay to respond to the negative starting-torque, in the direction of rotation of the negative-sequence voltage-vector $E_2$; or that the torque-producing element W, if it is energized from a system of delta-connected voltages, shall be responsive to the area of the delta-triangle and to the order of phase-sequence or succession of the phases in the delta-triangle; or that the torque-producing element W, if it is a two-phase element, shall develop an operating force which is responsive to the product of the magnitudes of the two relay-voltages, multiplied by the sine of the phase-angle between them. Any relaying device, electromechanical, static, or otherwise, which will serve to close an electrical circuit sufficiently to trip a circuit breaker whenever the negative-sequence voltage is greater than the positive-sequence voltage, will do the job within the broad concept of the invention.

When the polyphase torque-producing element W is balanced, in all phases of a symmetrical polyphase set of phases, it will not respond to the zero-sequence voltage-component, even though such a voltage-component is present in the impressed voltages. When, however, the circuits of the polyphase torque-producing element W are not balanced, it is quite desirable to keep zero-sequence currents out of said element, either by keeping the zero-sequence voltage-component out of the polyphase voltages which are impressed upon the torque-producing element, or by making the connections in such a way that there is no return-path for any flow of zero-sequence current in any phase-winding of the element; thus preventing the possibility of a shifting of the balance-point of the element as a result of hybrid torques involving the product of the zero and positive-sequence components, or the product of the zero and negative-sequence components.

I believe that my invention has a very important utility in its applicability to a cylinder-type multipolar relay-element W, preferably one which has four poles, with two diametrically flowing fluxes, in accordance with the broad principles described and claimed in the Sonnemann Patent 2,380,197, granted July 10, 1945, using a lightweight conducting cylinder as the torque-producing rotor-member. Such an element has the advantage of compactness, an extremely low rotor-inertia and hence a high speed of response, and freedom from the pulsating double-frequency torques which interfere with the sensitivity of certain other kinds of wattmeter-type relays. It is to be noted, however, that the four-pole cylinder-type relay-element has only two energizing-circuits, whereas, to serve in my compensator relaying-system, it must be energized from a three-phase compensated bus-voltage, in such a manner as to respond only when the negative-sequence voltage is larger in magnitude than the positive-sequence voltage. This requires special circuit-connections for satisfactorily energizing a two-winding torque-producing element W from a source of three-phase voltages.

When these connections are made, however, using a line-current-energized compensator or compensators for compensating the polyphase bus-voltage, with the proper compensator-impedance to produce a zero relay-torque at a desired balance-point, such a combination has the very distinct advantage of completely avoiding the necessity for using directional relays in responding to faults involving more than one line-conductor. The positive and negative-sequence components of the compensated polyphase relay-voltages are equal, for faults at the balance-point, while the positive-sequence component prevails for faults which are even very slightly beyond the balance-point, and the negative-sequence component prevails for faults which are even very slightly nearer than the balance-point. Thus, the balance-point of such a combination may be set, and maintained, very accurately, more so than has heretofore been possible. Such a combination also has an advantage in responding to faults near the relaying station bus, because the line-currents, which energize the compensators, are in one direction when the fault is in front of the line-current transformers, and in the other direction when the fault is behind the line-current transformers.

Figure 3:
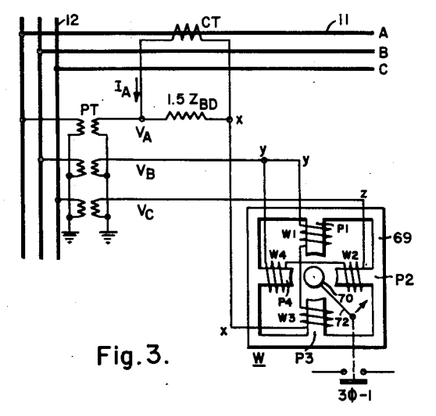
Fig. 3 is a simplified diagram of the essential basic principles of my single-compensator three-phase relay, as exemplified by the first-zone three-phase relay 3φ–1, but showing the use of a four-pole cylinder-type torque-producing element.

Fig. 3 is a very much simplified diagram illustrating the basic essential principles involved in the operation of my new single-compensator three-phase fault-responsive relay which is exemplified by the first-zone three-phase element $3\phi-1$ in Fig. 1, but using a four-pole cylinder-type torque-element W.

In Fig. 3, the potential transformers PT reproduce the line or bus-voltages $V_A$, $V_B$ and $V_C$. The single compensator CP, which is shown for this element $3\phi-1$ in Fig. 1, is represented in Fig. 3 as an impedance which has a value of 1.5 times the line-impedance $Z_{BP}$ of the protected line 11, out as far as the desired balance-point of the relay, this impedance, $1.5Z_{BP}$ being connected between the bus-voltage terminal $V_A$ and the compensated-voltage terminal $x$. In Fig. 3, this impedance $1.5Z_{BP}$ is traversed by the line-current $I_A$, as supplied by the current-transformer CT, so as to produce the same impedance-voltage-drop as the compensator CP for this first-zone three-phase element $3\phi-1$ in Fig. 1.

In Fig. 3, the torque-producing element W is diagrammatically shown, in its preferred form of embodiment, as a four-pole cylinder-type element, comprising a stationary magnetizable frame 69 having four salient poles P1, P2, P3 and P4, carrying windings W1 to W4, respectively. Inside of the four poles there is a lightweight, rotatably mounted cylinder 70 of aluminum or other conducting material in which eddy currents are induced for producing a rotational torque tending to rotate the cylinder in one direction or the other, according to the predominance of the positive or negative phase-sequence component of the currents in the windings W1 to W4. Since the relay-element W operates on alternating current, its stationary magnetizable member 69 is preferably of laminated material, while the cylindrical rotor-element 70 is preferably made of a lightweight non-magnetizable conducting material. An operating-arm 72 is attached to the rotor-cylinder 70, for actuating the contact-member $3\phi-1$ when the element W responds.

Figure 4:
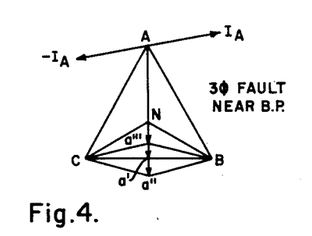
Figs. 4 and 5 are vector diagrams which will be referred to in the explanation of Fig. 3.

Fig. 4 is a vector diagram illustrative of the response of the relay of Fig. 3 to three-phase faults in the vicinity of the balance-point of the relay. The equilateral triangle ABC is representative of the bus-voltage conditions at the relaying station, the line-to-neutral voltages being indicated at NA, NB and NC. Since the conditions existing during a three-phase fault are symmetrical, it does not make any difference in which phase the single compensator is connected, and hence the phase in which this compensator is connected may be denominated A. The line-current $I_A$ in this phase, during a three-phase fault on the protected power-line, will lag behind the line-to-neutral voltage NA by an angle which is the same as the impedance-angle of the line; and since the compensator which I use has the same impedance-angle as the line-impedance, the compensator-voltage $Aa'$ which is subtracted from the line-to-neutral bus-voltage NA lies in the same line as said line-to-neutral bus-voltage NA, opposing said bus-voltage.

If a three-phase fault should occur exactly at the balance-point of the relay, in Fig. 4, the magnitude of the compensator-voltage $Aa'$ will be exactly 1.5 times the magnitude of the line-to-neutral bus-voltage NA, which would bring the terminal $a'$ of the phase A compensated voltage down to the mid-point of the base BC of the bus-voltage triangle ABC. This means that the three voltages $xyz$ which are impressed upon the torque-element W in Fig. 3 are the three voltages $a'BC$ of Fig. 4, this being a collapsed triangle which has been reduced to a single straight line BC, so that the torque-element does not receive two out-of-phase voltages and hence the torque-element produces no torque and no response.

If the three-phase fault, in Fig. 4 had been located at a point which is closer than the balance-point, the phase A line-current $I_A$, or minus the sum of the two line-currents $(I_B + I_C)$, (there being no zero-sequence current $I_0$ when there is a three-phase fault), will be larger in proportion to the line-to-neutral bus-voltage NA, than in the case when the fault was at the balance-point, and hence the compensator voltage-drop $Aa''$ will be larger, resulting in a negative-sequence compensated-voltage triangle $a''CB$, which will produce a relay-response. If the three-phase fault had been beyond the balance-point, the resulting compensated-voltage triangle $a''BC$ would have had the positive phase-sequence or succession of phases, and the relay would not respond.

Figure 5:
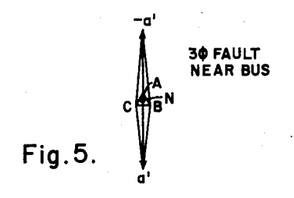

Fig. 5 is a vector-diagram depicting conditions which are obtained when the three-phase fault is at, or very close to, the relaying bus. If the fault is exactly at the bus, the bus-voltage will completely collapse to the neutral-point N, but if the fault is slightly removed from the bus, either in front of it or behind it, the bus-voltage triangle will be a small positive-sequence triangle such as ABC.

If the three-phase fault is exactly at the bus, in Fig. 5, the only voltage which will be applied to the torque-element will be the voltage-drop in the single compensator, which is connected in phase A, namely, the voltage $Na'$, or $N(-a')$, depending upon whether the fault is immediately in front of the current transformer CT, in which case the line-current will be as shown as $AI_A$ in Fig. 4, or immediately behind the current transformer CT, resulting in a current such as $A(-I_A)$ which is shown in Fig. 4. Under these circumstances, the torque-element cannot develop any torque, and hence it cannot respond, except possibly momentarily on a memory-action in response to the collapsing BC voltage.

If the three-phase fault is sufficiently far in front of the bus to permit the magnitude of the delta bus-voltage BC to be large enough to be sensed by the very sensitive polyphase-responsive torque-element or relay, the relay will be impressed with a voltage-triangle $a'$CB which has a negative phase-sequence, so that the relay responds, but if such a fault is back of the bus, the relay will be impressed with a positive-sequence voltage-triangle $(-a')$BC, and the relay cannot respond.

Figure 6:
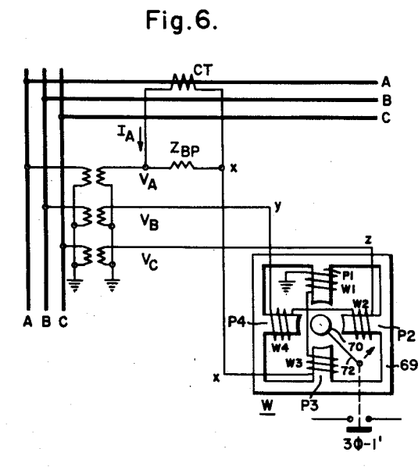
Fig. 6 is a view similar to Fig. 3, but showing connections which make it possible to use a compensator having the same impedance as the compensators which are used in the phase-fault relay-unit φφ for the same zone.

Fig. 6 shows a modification of Fig. 3, which makes it possible to use a compensator-impedance which is the equivalent of the line-impedance to the desired balance-point of the relay, as indicated by the impedance $Z_{BP}$, in place of the impedance $1.5Z_{BP}$ in Fig. 3. This is accomplished by using a line-to-neutral voltage, instead of a delta voltage, for the windings W3 and W1 which are energized from the compensated-voltage phase $x$. Thus, it will be noted, in Fig. 6, that the coils W3 and W1 are connected between the voltage-terminal $x$ and the neutral-point or ground of the star-connected potential-transformer secondaries. The relay-performance is just the same as has been described for Fig. 3.

Figures 7, 8:
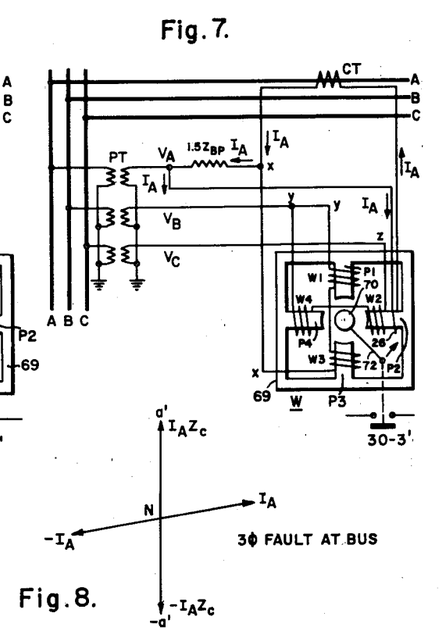
Fig. 7 is a simplified diagram of the essential basic principles of my backwardly looking three-phase carrier-starting relay 3φ–3′, showing the use of a four-pole cylinder-type torque-element W, and further showing the use of a modification which causes this relay to respond to three-phase faults at the bus, and for a short distance behind the bus.
Fig. 8 is a vector diagram illustrative of the operation of the apparatus shown in Fig. 7.

Fig. 7 is a simplified diagrammatic showing which illustrates the principle of my new current-biased backwardly looking carrier-starting three-phase element $3\phi$–$3'$ of Fig. 2A, showing the use of a four-pole cylinder-type torque-element W, and showing the manner in which the auxiliary current-energized coil or winding 26 may be used in said torque-element. Since this relay-unit is backwardly looking, with a balance-point far back of the relaying bus, the direction of flow of the line-current $I_A$ through the compensator-impedance $1.5Z_{BP}$, in Fig. 7, is the reverse of that which is shown in Fig. 3, and this same current, $I_A$, is used, in Fig. 7, to pass through a single-turn current-energized coil 26 which is placed on one (or both) of the diametrically opposite poles P2 and P4. The current-coil 26 is energized in such polarity that the diametrically flowing current-responsive flux in poles P2 and P4 lags behind the diametrically flowing voltage-responsive flux in poles P1 and P3, when the $yz$ voltage on poles P2 and P4 is zero, due to a three-phase bus-fault, and when the $xy$ voltage on poles P1 and P3 is due solely to the voltage which is produced by the compensator.

The operation of the relay-unit $3\phi$–$3'$ of Fig. 7 will be understood by reference to Fig. 8. The current-responsive energization of the current-coil 26 is so small that it has no important effect upon the performance of the relay-unit, except for three-phase faults which are very close to the bus, in which case the BC bus-voltage, which is also the $yz$ relay-voltage, is zero, as is also the line-to-neutral bus-voltage in phase A. Under these conditions, the only fluxes in the torque-element W of Fig. 7 are a horizontal flux in the current-energized poles P2 and P4 of Fig. 7, due to the current $I_A$ or $NI_A$ in Fig. 8 (if the fault-current is flowing in the direction shown by $I_A$ in Figs. 7 and 8), and a perpendicular flux in the voltage-energized poles P1 and P3 of Fig. 7, due to the additively connected compensator-voltage $I_A Z_c$ or $Na'$ in Fig. 8, where $Z_c$ is the compensator-impedance, which is $1.5Z_{BP}$, or 1.5 times the line-impedance up to the balance-point of the relay. It will be noted that the current $NI_A$, in Fig. 8, lags behind the voltage $Na'$, by a phase-angle which is equal to the impedance-angle of the line. If the impedance-angle of the voltage-energized windings W1 and W3 of the relay is smaller than the impedance-angle of the line, then the flux due to the current $NI_A$ will still lag behind the flux due to the voltage $Na'$, in the relay, and the relay will have a positive operating-torque, resulting in a relay-response, even when the three-phase fault occurs practically at the bus.

If the fault should be on the other side of the bus, the line-current $I_A$ and the compensator-voltage $I_A Z_c$ will both reverse, as indicated by the minus signs in Fig. 8, and the flux in the horizontally disposed poles P2 and P4 will still lag behind the flux in the vertically disposed poles P1 and P3, showing that the current-energized coil 26 of Fig. 7 will cause the torque-producing relaying-element W of Fig. 7 to respond to a three-phase fault close to the bus, regardless of the direction of the fault-current.

The addition of the current-energized coil 26 to the three-fault relay-unit thus, in effect, modifies the response-circle characteristic of the relay so that the response-circle, instead of passing through the origin of the line-reactance and line-resistance coordinates, has a small bulge, in the vicinity of the origin, so that the impedance circle of the relay bulges out around the origin, causing the origin to fall within the bulged-out impedance-circle, meaning that the relay will have a response for faults at the bus, and for a short distance behind the bus. The relay thus loses its inherent directional characteristic, such as is possessed by all of the other illustrated relays except the KS relay in Fig. 2A. This is not objectionable, however, in the case of a third-zone relay, because the third-zone relay affords the last backup protection which is available in the entire relaying equipment. The response of the third-zone element cannot be effective until the expiration of a considerable time-delay which is determined by the TD3 contact of the timer TD, and by that time any three-phase fault which has not yet been cleared from the power-system will have to be cleared, no matter which side of the bus it is on, and hence it is not objectionable for the third-zone element to have a small reach in the direction opposite to the principal reach or balance-point of the relay.

It will be noted, in the preferred form of embodiment of my second and third-zone three-phase elements $3\phi$–2 and $3\phi$–3, as shown in the non-carrier equipment of Fig. 1, that I do not include the current-energized coil 26; as I prefer to use such a current-energized coil 26 only on the backwardly looking, carrier-starting, third-zone element $3\phi$–$3'$ of the carrier-current relaying equipment of Figs. 2A and 2B. It is to be understood, however, that it is quite possible to add such a current-energized coil 26 to the forwardly looking second and third-zone three-phase elements $3\phi$–2 and $3\phi$–3 of Fig. 1, and this is more particularly true of the third-zone element $3\phi$–3, in which case the additional current-energized winding 26 will be for the same purpose, namely, to cause the relaying element to have a response for three-phase faults at the bus, and for three-phase faults which are a short distance behind the bus.

In the foregoing forms of embodiment of a relaying assembly including my invention, as shown in Figs. 1 and 2, I have shown and described certain mutual compensator-impedances which match the line-impedance of the protected power-line 11, to a predetermined point which is to correspond to the balance-point of the fault-responsive relay in question; or in some cases, I have defined the compensator-impedance as being the equivalent of a certain multiplier times the balance-point line-impedance $Z_{BP}$. The balance-point line-impedance $Z_{BP}$, to which I have been referring, includes the small resistance-component of the line-impedance, as well as the large reactive component thereof. This is shown by the provision of the resistance R1 (Fig. 1), which causes the phase-angle of the effective mutual compensator-impedance to match the phase-angle of the line-impedance of the particular power-line 11 which is being protected. The reason for this, is that I am using compensated bus-voltages. I am using a line-drop compensator or compensators to produce either the same proportionate voltage-drop as would be obtained in the line itself between the bus and the desired balance-point of the relay, or in other cases I have used a compensator voltage-drop which is related, in certain other defined ways, to the voltage-drop in the line-impedance between the bus and the aforesaid balance-point.

By causing the compensator-impedance to have the same phase-angle as the line-impedance, and by energizing the compensator with the same line-current which causes the impedance voltage-drop in the line, I achieve the result that the compensator voltage-drop will always lie along the line of the vector which represents the line-drop voltage from which the compensator-voltage is substracted, or to which the compensator-voltage is added, depending upon the polarity of the compensator-connections. While theoretically, some sort of possibly tolerable accuracy of response might be obtained by ignoring the resistance parts of the line-impedances, the generator-impedances, and the like (as has been done with previous types of distance-responsive relays which did not use compensated voltages in the manner which I am doing, in responding to faults), I believe that the additional accuracy of operation which is obtainable by matching the phase-angle as well as the magnitude or magnitude-ratio of the line-impedance to the balance-point, is sufficiently important to more than warrant the slight additonal complication which is involved by the use of the resistor R1 or its equivalent.

In the preceding description of the fault-responsive units, such as the phase-to-phase unit $\phi\phi$-1 in Fig. 1, I have stated that the effective impedance of certain compensators is equal to the line-impedance to a fault at the desired balance point. This statement really presupposes that the line has a single impedance, which is the same in all three of the line-conductors A, B and C, which is true of a well-constructed balanced transmission-line in which there is adequate transposition of the phase-wires. In the case of a non-transposed transmission-line, the reactance parts of the impedances of the three line-wires will not all be the same, and it must be understood, in such a case, that each such compensator could be set to match the impedance of its own line-wire. I wish my description to be read with this explanation in mind.

In the preceding description of the coincidence of the phase-angle of the compensator voltage-drop with the phase-angle of the voltage to which the compensator voltage-drop is being added or subtracted, have really been assuming the general case in which the impedance of the fault itself is negligibly small, so that the voltage between the faulted phases is zero at the fault.

While I have illustrated my invention in several different forms of embodiment, and while I have explained the general principles of its design and operation in the best form and manner at present visualized, I wish it to be understood that the foregoing illustration, description and explanations are only by way of example, and were not intended as limitations, in the sense that it is possible to substitute various equivalents, or to add certain additional refinements, or to omit certain of the illustrated refinements which may not be needed in any particular case, without departing from the essential spirit of my invention.

I claim as my invention:

1. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages, for controlling an electrical circuit when the compensated polyphase voltages have a negative sequence of phases.

2. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a two-circuit polyphase-responsive relaying element, energized from two delta phases of the compensated polyphase voltages, for controlling an electrical circuit when the compensated polyphase voltages have a negative sequence of phases.

3. A compensated-voltage three-phase fault-responsive relaying unit for responding to three-phase faults on a three-phase transmission-line said unt including: a means energized from the line-voltage at the relaying station, for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the cmopensated polyphase voltages have a positive sequence of phases upon the occurrence of a three-phase fault at any other location; and a two-circuit polyphase responsive relaying element, energized respectively from a compensated-voltage phase which contains said compensator and from a compensated-voltage phase which does not contain said compensator, for controlling an electrical circuit when the compensated polyphase voltages have a negative sequence of phases.

4. A compensated-voltage three-phase fault-responsive relaying unit for responding to three-phase faults on a three-phase transmission-line, said unit including: a means, energized from the line-voltage at the relaying station for producing a set of derived polyphase voltages having a phase-sequence corresponding to the line-voltages; a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; a force-producing relaying element having two energizing-means for producing two different interacting fluxes; a means for exciting one of said energizing-means from a compensated-voltage phase which contains said compensator; and a double-acting means for exciting the other energizing-means partly from a compensated-voltage phase which does not contain said compensator, and partly from the means for energizing the compensator; said relaying element developing a force in the responsive direction when the compensated voltages have a negative sequence of phases, and also when said derived polyphase voltages are substantially zero.

5. A protective-relaying combination, for protecting a three-phase transmission-line against all faults, involving more than one line-phase, which occur on the transmission-line between the relaying station and a predetermined fault-location on the line; said combination including a compensated-voltage three-phase fault-responsive relaying unit, a compensated-voltage phase-fault relaying unit; and a relay-controlled circuit-means for performing a fault-protective function for the transmission-line, in response to either of said units; said units including a means, energized from the line-voltage at the relaying station, for producing a set of derived polyphase voltages having a phase-sequence corresponding to the line-voltages; said three-phase relaying unit further including: a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages of said three-phase unit, for controlling an electrical circuit when said compensated polyphase voltages have a negative sequence of phases; and said phase-fault relaying unit further including: a set of three line-drop compensators, connected in series-circuit relation to the respective phases of said derived polyphase voltages for producing a set of compensated polyphase voltages, and energized proportionately to the respective line-currents in the corresponding line-wires of the transmission-line; each of said three line-drop compensators having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from the compensated polyphase voltages of said phase-fault unit, for controlling an electrical circuit when said compensated polyphase voltages have a negative sequence of phases.

6. A multi-zone protective-relaying combination, for protecting a three-phase transmission-line against all faults, involving more than one line-phase, which occur on the transmission-line between the relaying station and a predetermined fault-location on the line; said combination including an inherently directional first-zone compensated-voltage phase-fault relaying unit; an inherently directional first-zone compensated-voltage three-phase-fault-responsive relaying unit; other-zone compensated-voltage phase-fault and three-phase-fault-responsive relaying units; a timer which begins to count time in response to any one of a plurality of said other-zone relaying units; a first-zone relay-controlled circuit-means, for performing a substantially immediate fault-protective function for the transmission-line in response to either of said first-zone relaying units; and an other-zone relay-controlled circuit-means, for performing a delayed fault-protective function, dependent upon the action of said timer, in response to any of said other-zone relaying units; all of said relaying units including a means, energized from the line-voltage at the relaying station, for producing a set of derived polyphase voltages having a phase-sequence corresponding to the line-voltages; said first-zone phase-fault relaying unit further including: a set of three line-drop compensators, connected in series-circuit relation to the respective phases of said derived polyphase voltages for producing a set of compensated polyphase voltages, and energized proportionately to the respective line-currents in the corresponding line-wires of the transmission-line; each of said three line-drop compensators having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from the compensated polyphase compensated voltages of said first-zone phase-fault unit, for controlling an electrical circuit when said compensated polyphase voltages have a negative sequence of phases; said first-zone three-phase relaying unit further including: a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; and a polyphase-responsive relaying element, energized from the compensated polyphase voltages of said first-zone three-phase unit, for controlling an electrical circuit when said compensated polyphase voltages have a negative sequence of phases; said protective-relaying combination being characterized by said other-zone relaying units including a three-phase fault-responsive relaying unit which further includes: a compensator, connected in series-circuit relation to one phase of said derived polyphase voltages for producing a set of compensated polyphase voltages; a means for energizing said compensator proportionately to the line-current in the corresponding line-wire of the transmission-line; said compensator having an impedance equivalent to 1.5 times the line-impedance to a predetermined fault-location, whereby the compensated polyphase voltages collapse to a single phase upon the occurrence of a three-phase fault at said predetermined fault-location, and also upon the occurrence of a three-phase fault at the relaying station, whereby the compensated polyphase voltages have a negative sequence of phases upon the occurrence of a three-phase fault between the relaying station and said predetermined fault-location, and whereby the compensated polyphase voltages have a positive sequence of phases upon the occurrence of a three-phase fault at any other location; a force-producing relaying element having two energizing-means for producing two different interacting fluxes; a means for exciting one of said energizing-means from a compensated-voltage phase which contains said compensator; and a double-acting means for exciting the other energizing-means partly from a compensated-voltage phase which does not contain said compensator, and partly from the means for energizing the compensator; said force-producing relaying element developing a force in the relay-actuating direction when said compensated polyphase voltages have a negative sequence of phases, and also when said derived polyphase voltages are substantially zero.

7. In a relaying assembly, a phase-sequence-responsive translating device having a plurality of first input terminals suitable for energization by a polyphase voltage, said device being responsive to the difference between the positive-phase-sequence component and the negative-phase-sequence component of a polyphase voltage applied to the terminals for operation from a first circuit-control condition to a second circuit-control condition, a plurality of impedance units each having an impedance angle adjustable in the range of impedance angle of a line of a polyphase transmission system in a zone normally protected by distance relays, each of said impedance units having a terminal connected to a separate one of the first input terminals and having a second terminal, a plurality of input means each effective when energized for directing a current through at least part of a separate one of the impedance units which does not pass through the translating device, whereby the translating device is energized by a polyphase voltage dependent on the resultant of the polyphase voltage applied to the second terminals and the voltage across the impedances, a second phase-sequence-responsive translating device having a plurality of third input terminals suitable for energization by a polyphase voltage, said last-named device being responsive to the difference between the positive-phase-sequence component and the negative-phase-sequence component of a polyphase voltage applied to the third input terminals for operation from a first circuit-control condition to a second circuit-control condition, an adjustable impedance unit having a terminal connected to one of the third input terminals and having a fourth terminal, and input means effective when energized for directing a current through at least part of the last-named impedance unit which does not pass through the second translating device, the impedance values of the last-named impedance unit being substantially larger than the impedance values of said plurality of impedance units.

8. In a relaying assembly for protecting a polyphase transmission line, a first phase-sequence-responsive translating device, said device being responsive to the difference between the positive-phase-sequence component and the negative-phase-sequence component of a polyphase voltage applied to the terminals for operation from a first circuit-control condition to a second circuit-control condition, a plurality of impedance units each having an impedance angle adjustable in the range of impedance angle of a line of a polyphase transmission system in a zone normally protected by distance relays, each of said impedance units having a terminal connected to a separate one of the first input terminals and having a second terminal, said second terminals being connected for energization in accordance with a set of polyphase voltages derived from said line voltages, a plurality of input means each effective when energized for directing a separate current from a set of polyphase currents derived from the currents of said line through at least part of a separate one of the impedance units which does not pass through the translating device, said impedance units being symmetrically disposed between the second terminals and the first input terminals, whereby the translating device is energized by a set of polyphase voltages dependent on the resultant of the set of polyphase voltages applied to the second terminals and the voltages across the impedances, a second phase-sequence-responsive translating device having a plurality of third input terminals suitable for energization by a polyphase voltage, said last-named device being responsive to the difference between the positive-phase-sequence component and the negative-phase-sequence component of a polyphase voltage applied to the third input terminals for operation from a first circuit-control condition to a second circuit-control condition, a plurality of fourth terminals connected for energization in accordance with a set of polyphase voltages derived from said line, an asymmetric adjustable impedance unit connected between the third and fourth terminals to present an asymmetric polyphase impedance therebetween, and input means effective when energized for directing a current through at least part of the last-named impedance unit which does not pass through the second translating device, said first translating device responding to phase-to-phase faults of a predetermined zone of said line and the second translating device responding to balanced faults in said zone.

References Cited in the file of this patent

UNITED STATES PATENTS

| | | |
|---|---|---|
| 2,221,602 | Parsons | Nov. 12, 1940 |
| 2,295,398 | Griscom | Sept. 8, 1942 |
| 2,408,208 | Goldsborough | Sept. 24, 1946 |
| 2,426,062 | Sonneman | Aug. 19, 1947 |
| 2,445,429 | Goldsborough | July 20, 1948 |
| 2,479,345 | Goldsborough | Aug. 16, 1949 |

FOREIGN PATENTS

| | | |
|---|---|---|
| 585,516 | Great Britain | Feb. 10, 1947 |